No. 629,279. Patented July 18, 1899.
D. F. TROWBRIDGE.
FLY CATCHER.
(Application filed Feb. 16, 1899.)
(No Model.)
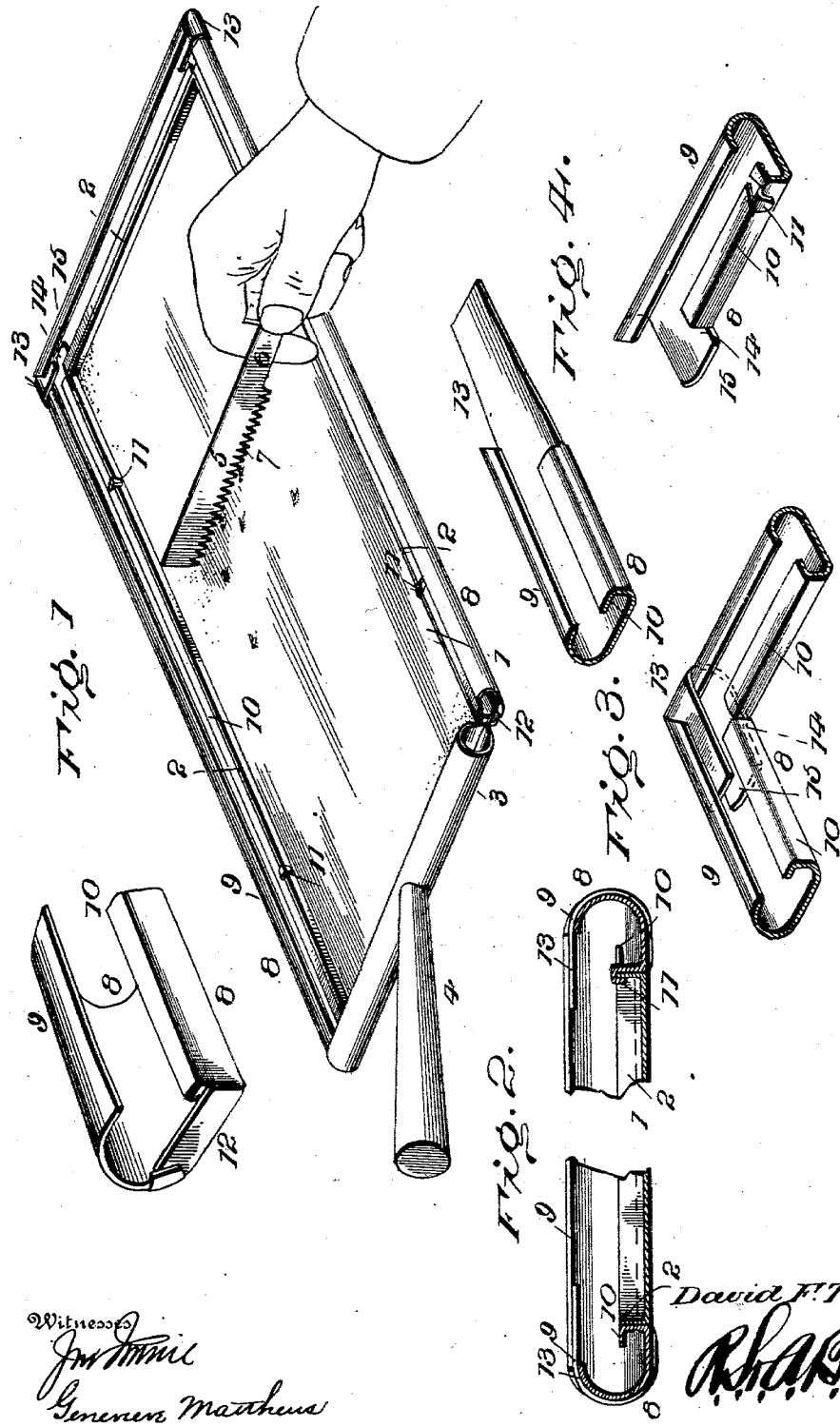
Inventor
David F. Trowbridge

UNITED STATES PATENT OFFICE.

DAVID F. TROWBRIDGE, OF TYRONE, IOWA.

FLY-CATCHER.

SPECIFICATION forming part of Letters Patent No. 629,279, dated July 18, 1899.

Application filed February 16, 1899. Serial No. 705,683. (No model.)

*To all whom it may concern:*

Be it known that I, DAVID F. TROWBRIDGE, a citizen of the United States, residing at Tyrone, in the county of Monroe and State of Iowa, have invented certain new and useful Improvements in Fly-Catchers; and I do hereby declare the following to be a full, clear, and exact description of the invention, such as will enable others skilled in the art to which it appertains to make and use the same.

The object of this invention is the provision of simple and effective means for clearing a room of flies, mosquitos, or like winged insects, the device being designed for use either by being manipulated or placed in a fixed position.

The structure consists of a tray having a handle at one end for convenience of operation when beating the air to catch or shoo the flies to a selected spot, said tray being filled with any sticky preparation, such as commonly applied to fly-paper for the purpose of catching any fly coming in contact therewith. Combined with the tray is a trough detachably applied to the edges thereof and adapted to hold a poison or insecticide, said trough being separable, so as to be packed in a small space, and having its parts loosely connected to prevent breakage or rupture, which would result by employing rigid joints. A collector is used in connection with the tray to remove the flies therefrom without gathering any appreciable quantity of the sticky preparation.

The invention will be described in detail hereinafter; and it consists of the novel features particularly claimed and illustrated in the accompanying drawings, in which—

Figure 1 is a perspective view of the device, showing the collector operatively related. Fig. 2 is a transverse section. Fig. 3 is a detail perspective view of the joint formed between right-angularly-disposed parts of the trough. Fig. 4 is a view similar to Fig. 3, the parts being separated. Fig. 5 is a detail view in perspective of the outer or free end portion of the trough.

Corresponding and like parts are referred to in the following description and indicated in all the views of the drawings by the same reference characters.

The tray will be constructed of paper, wood, fiber, metal, or other sheet material and may be of any size or shape and is preferably formed of sheet metal and of right-angular outline. The blank or body 1 from which the tray is formed has its sides and one end bent upwardly, forming retaining-flanges 2, the opposite end being rolled, as shown at 3, for attachment therewith of a handle 4, which inclines to the plane of the tray for convenience of grasping. This tray in practice is supplied with a sticky preparation, such as commonly applied to fly-paper of ordinary commerce, and may be placed in any desired position or manipulated as desired and found most advantageous to rid the room or place of flies or other winged insects. The roll 3 and flange 2 prevent the escape of the preparation supplied to the tray.

The flies or like insects entangled by the sticky preparation are removed from the tray by means of a collector 5, which consists of a strip of suitable length, having a handle 6 at one end and a toothed edge portion 7 at the opposite end, the teeth being comparatively short and pointed. This collector is formed, preferably, of a single strip or blank of sheet metal by being struck up or stamped therefrom. When freeing the tray from the entangled insects, the collector is grasped, about as shown in Fig. 1, and is swept over the tray so as to pick up the insects, the preparation passing through the spaces formed between the teeth, preventing waste thereof.

A trough 8 is applied to the sides and outer end of the tray in such a manner as to be readily disconnected therefrom. This trough contains a poison or insecticide, which is designed to cause the death of such insects as are not entangled by the preparation upon the tray and feed upon the contents thereof. The inner edge portion of the trough or that adjacent to the tray is of less height than the outer edge portion, and the latter is recurved, so as to overhang the trough, as shown at 9. A flange 10 extends outward from the inner edge of the trough and forms a ledge for the flies to light upon when partaking of the insecticide. These inner flanges 10 also strengthen and stiffen the trough and prevent the spilling of the insecticide and the mixing thereof with the sticky preparation supplied to the tray. Portions are cut or punched from the flange 10 and are bent backwardly, forming wings or clips 11, which are designed to engage over the flange 2 of the tray and retain the trough in position. The outer or free ends of the trough are flanged, as shown at 12, to retain the insecticide therein. As clearly indicated, the trough is composed of sections, so as to conform to the sides and end of the tray, and the matching or adjacent ends or corresponding sections are connected in such a manner as to admit of the sections having a limited movement and of their being readily disconnected to admit of the trough being packed in a small space. The terminal portions of the middle or end section of the trough have their bottom portions extended, forming tongues 13, which are recurved or bent so as to embrace the contiguous ends of the adjacent side sections. These tongues 13 when bent underlap the subjacent portions of the overhanging part 9, thereby preventing the straightening or outward displacement of the tongues after the parts have been properly fitted together. The terminal portions of the inner flange 10 of the middle section and of the inner flanged portion are cut away, as shown at 14, so as to match and receive the adjacent ends of the side sections. Inner extensions 15 are provided at the outer ends of the side sections and are adapted to enter the end portions of the middle section and interlock therewith. These extensions 15 are formed by cutting the inner flange 10 and the vertical flange of the side sections a short distance from their extremities and straightening out the said flanges, as indicated. When it is required to disconnect the sections, the tongues 13 are drawn laterally to disengage them from the overhanging portion 9 of the end section and are bent back a sufficient distance to admit of the side sections being lifted from the middle or end section. It is not the intention to supply a liquid poison to the trough. Hence it is not essential that the joints be watertight. Any suitable material may be employed in the construction of the trough; but it is preferred to form it of sheet metal, which is bent into the form substantially as shown.

When it is required to clear the tray of insects, the operation can be accomplished to the best possible advantage by removing the trough and holding the tray to the fire to warm the preparation, thereby rendering it more fluid. The insects can be quickly and easily removed by means of the collector in the manner shown and herein set forth.

Having thus described the invention, what is claimed as new is—

1. A fly-catcher consisting of a tray comprising an imperforate bottom adapted to receive a quantity of sticky preparation, a perimetal flange forming sides to limit the spread and prevent wasting of the said preparation, and a handle projecting from a side of the tray, substantially as and for the purpose set forth.

2. A fly-catcher consisting of a tray having flanges at two of its sides and at one end, and having the opposite end formed into a roll, and a handle applied to the said roll, substantially as described.

3. A fly-catcher, consisting of a tray formed from a sheet-metal blank having its sides and one end bent to provide flanges and having the opposite end formed into a roll, and a handle applied to the roll and inclining to the plane of the tray, substantially as described.

4. A fly-catcher consisting of a tray adapted to receive a sticky preparation and formed of a bottom and inclosing sides and having a trough at its outer edge to receive an insecticide.

5. A fly-catcher consisting of a tray adapted to receive a sticky preparation and formed of a bottom and inclosing sides, and a trough detachably fitted to the outer edge of the tray, substantially as specified.

6. A fly-catcher, consisting of a tray having a flange at its outer edge, and a trough having integral wings or clips to engage with the said flange and detachably connecting the trough with the tray, substantially as described.

7. In a fly-catcher, a tray to receive a sticky preparation, and having an upturned flange at its edge, and a trough for containing an insecticide having its inner edge portion fitted to the flanged edge of the tray and about equal in height thereto, and having its outer edge portion recurved and overhanging the trough, substantially as set forth.

8. In a fly-catcher, a tray to receive a sticky preparation and having an upturned flange at its edge, and a trough for containing an insecticide having its inner edge portion fitted to the flanged edge of the tray and provided with an approximately horizontal ledge overhanging the trough and forming a support for the insects, and having its outer edge portion recurved and extending over the trough at a higher elevation than the said horizontal supporting-ledge, as and for the purpose set forth.

9. In a fly-catcher, a trough composed of sections disposed at an angle relatively to one another, the terminal of one section being extended to form a tongue which is bent to embrace the contiguous end portion of the adjacent section, substantially as set forth.

10. In a fly-catcher, a sectional trough having its parts angularly disposed, one of the sections having an integral tongue which is bent to embrace the contiguous end of the other section, the latter having a like extension to interlock with the section formed with the aforesaid tongue, substantially as described.

In testimony whereof I affix my signature in presence of two witnesses.

DAVID F. TROWBRIDGE. [L. S.]

Witnesses:
DAVID A. MAIKEN,
CHARLES E. HIXENBAUGH.